Feb. 16, 1960
S. LARACH
2,925,532
POLYCHROMATIC ELECTROLUMINESCENT MEANS
Filed Dec. 1, 1955
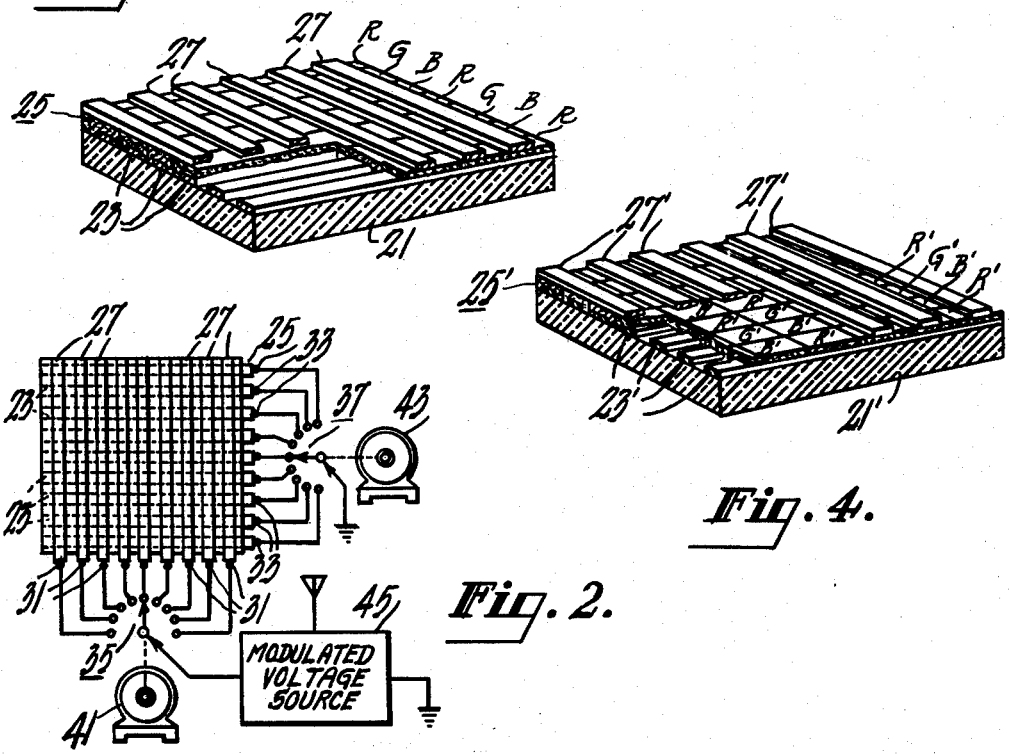
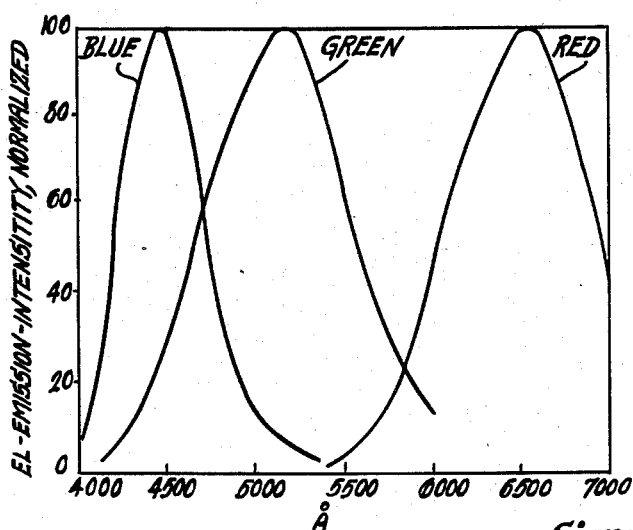
INVENTOR.
Simon Larach
BY
ATTORNEY

United States Patent Office 2,925,532
Patented Feb. 16, 1960

2,925,532
POLYCHROMATIC ELECTROLUMINESCENT MEANS

Simon Larach, Princeton, N.J., assignor to Radio Corporation of America, a corporation of Delaware Application December 1, 1955, Serial No. 550,261

14 Claims. (Cl. 315—169)

This invention relates to improved electroluminescent means and particularly, but not necessarily exclusively, to polychromatic electroluminescent screens that are useful in color mural television and to devices including said screens.

Electroluminescence is the term applied to the light emission obtained when an electric field is applied across a layer of electroluminescent phosphor particles, which particles are usually embedded or suspended in a dielectric medium. The layer of electroluminescent phosphor particles is referred to as an electroluminescent screen, which screen may also include a support for said layer, and may also include means for producing an electric field in said layer.

An object of the invention is to provide improved electroluminescent means.

Another object is to provide improved electroluminescent screens.

A further object is to provide polychromatic electroluminescent screens that are particularly useful in color mural television.

Electroluminescent means according to the invention comprise a combination of discrete electroluminescent areas or elements comprising blue-emitting area, a green-emitting area and a red-emitting area. The term "blue-emitting area" is intended to mean a phosphor area that emits predominantly blue light when excited. Similarly, the "green" and "red" areas emit predominantly green and red light, respectively. The blue-emitting area may comprise, for example, a phosphor selected from the system $xZnS.yZnSe:Cu(a)$ wherein:

$x = 0.9$ to $1.0$ mol
$y = 0.1$ to $0.0$ mol
$x+y = 1.0$ mol
$a = 0.01$ to $0.3$ weight percent The green-emitting area may comprise, for example, a phosphor selected from the system $xZnS.yZnSe:Cu(a):Al(b)$ wherein:

$x = 0.9$ to $1.0$ mol
$y = 0.1$ to $0.0$ mol
$x+y = 1.0$ mol
$a = 0.01$ to $0.3$ weight percent
$b = 0.004$ to $0.15$ weight percent The red-emitting area may comprise, for example, a phosphor selected from the two systems:

$xXnS:yZnSe:Cu(a)$ wherein:

$x = 0.001$ to $0.400$ mol
$y = .999$ to $0.600$ mol
$x+y = 1.00$ mol
$a = 0.01$ to $0.3$ weight percent;

and $cZnSe.dCdSe:Cu(a)$ wherein:

$c = 0.75$ to $1.0$ mol
$d = 0.25$ to $0.0$ mol
$c+d = 1.0$ mol
$a = 0.01$ to $0.3$ weight percent The electroluminescent means may comprise a multiplicity of groups of said electroluminescent areas, such as lines or dots arranged in a predetermined order of cyclic succession.

A luminescent screen according to the invention may include also electric field producing means for exciting the phosphor areas in a predetermined order of cyclic succession. One suitable excitation means may comprise a first grid of spaced parallel conductors in contact with one side of a layer of said areas, and a second grid of spaced parallel conductors on the other side of said layer, the conductors of the second grid being axially aligned at substantially right angles to the direction of the conductors of the first grid. Where the phosphor areas comprise an array of contiguous parallel strips, the phosphor areas overlie a particular conductor of the first or second grids in the space therebetween. Where the phosphor areas comprise an array of dots, each of said phosphor areas is positioned in the space between a particular conductor of the first grid and a particular conductor of the second grid.

The invention includes also devices comprising a luminescent screen of the invention and also means for exciting said phosphor groups in a predetermined order.

The invention is described in greater detail by reference to the accompanying drawing in which:

Figure 1 is a partially broken away, partially sectional, perspective view of one type of line screen according to the invention, Figure 2 is a partially schematic, plan view of the line screen of Figure 1 illustrating one means for exciting the phosphor groups of the screen in a predetermined order, Figure 3 is a graph showing the spectral distribution of the electroluminescence emission of each of the phosphors of the electroluminescent screen of Figure 1, and Figure 4 is a partially broken away, partially sectional, perspective view of one type of dot screen according to the invention.

Similar reference numerals are used for similar structures throughout the drawing.

*Example 1.*—Referring to Figure 1, a support plate 21 has a first grid of spaced parallel conductors 23 on one surface thereof. The support plate 21 may be opaque or transparent, for example, glass or plastic, and is preferably electrically-insulating. Where the support plate 21 is electrically-conducting, the surface should be coated with an electrically-insulating layer, for example, a copper plate coated with silicone resin coating. The first grid of spaced parallel conductors 23 may be metal such as silver or gold evaporated through a suitable mask; or metal uniformly evaporated and then machined to remove a portion of the evaporated film to form the grid. Instead of evaporated metal, silver paste may be smeared or sprayed upon the support plate 21 to produce the grid by one of the foregoing processes. Where the support plate 21 is glass, the electrodes may be formed by heating the glass plate to about 400° C. and treating the surface thereof with the vapors of tin chloride, silicon chloride, or titanium chloride to render the surface electrically-conducting. The glass surface may be masked during treatment or machined after treatment as described above. The grid may also be formed by machining grooves into the support plate 21 and then filling the grooves with an electrically-conducting material such as silver paste. For purposes of explanation, the glass support plate 21 has thereon spaced parallel conductors 23 formed by suitably masking one surface thereof, heating said masked surface to about 400° C., exposing said masked surface to tin chloride vapors and then cooling. Upon cooling, the mask is removed leaving electrically-conducting, light-transmitting strips making up the first grid.

Overlying the first grid is a phosphor layer 25 comprising a multiplicity of groups of discrete electro-luminescent phosphor areas or elements arranged in a predetermined order of cyclic succession. Each group comprises a red-emitting area R, a green-emitting area G, and a blue-emitting area B. Each area is in the form of a phosphor strip entirely covering a particular conducting strip 23 of the first grid. Thus, each red-emitting area R is a strip covering a single electrically-conducting strip 23 and is contiguous with a blue-emitting area B on one side and a green-emitting area G on the other side; each of said blue and green-emitting areas or strips also covering a single conducting strip of the first grid.

The red-emitting areas R comprise particles of an electroluminescent phosphor having the approximate composition 0.95ZnSe.0.05CdSe:Cu(0.15) dispersed in a silicone resin. The green-emitting phosphor areas G comprise particles of an electro-luminescent phosphor having the approximate composition

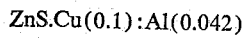

ZnS.Cu(0.1):Al(0.042)

dispersed in a silicone resin binder. The blue-emitting phosphor areas B comprise particles of an electroluminescent phosphor having the approximate composition ZnS:Cu(0.1). As used in this specification, numbers in parenthesis is a formula represent weight percentage of the ingredient with respect to the host crystal material.

The phosphor areas may be deposited by preparing a mixture of phosphor particles of one composition in a binder such as a silicone resin and a suitable plasticizer such as toluene. The mixture is then silk-screened in the desired patern and at the desired location and then dried. Then the second and third compositions are similarly prepared and applied. Alternatively, a photosensitizer such as ammonium dichromate may be mixed with phosphor particles of one composition, polyvinyl alcohol and a plasticizer. The mixture is coated on the first grid as by settling or spraying, exposed to a desired pattern of ultra violet light to harden the coating in the desired areas and then washed to remove the coating in the unexposed areas. The second and third phosphor compositions may be similarly applied.

Over the phosphor layer 25 is a second grid of electrically-conducting strips 27 similar to the conducting strips 23 of the first grid, except that they are positioned with their axes at about right angles to the axes of the strips of the first grid 23 and spaced from the first grid 23 by the phosphor layer 25. The axes of the conducting strips of the second grid may be at any angle with respect to the axes of the first grid provided each strip of the second grid covers a substantial number of strips of the first grid. The strips of the second grid may be prepared by any of the methods described for the first grid. For purposes of explanation, the strips of the second grid are prepared by spraying silver paste upon a suitable mask, drying, and then removing the mask.

The phosphor areas of the layer 25 are described as overlying and parallel to the conducting strips 23 of the first grid. However, such phosphor areas may also be arranged to overlie the strips 23 of the first grid and be parallel to the strips 27 of the second grid.

The various structures of the apparatus of Figure 1 are not shown in true relative size. The support plate 21, the grids 23 and 27 and the phosphor layer 25 may be thicker or thinner according to the particular installation. Each structure is illustrated in such size as to facilitate the explanation and description of the invention.

Referring to Figure 2 there is shown the conducting strips 23 and 27 of the first and second grids and the phosphor layer 25 of Figure 1. One end of each set of the conducting strips of each grid has attached thereto a set of terminals 31 and 33. The terminals 31 and 33 may take the form of contacting surfaces which, for some installations may be sufficiently rugged to serve as wiper contacts. Alternatively, the terminals 31 and 33 may be connected by wiring or other means to terminals of wiper switches 35 and 37 or other multiplexing means. In Figure 2, the terminals 31 are connected by wiring to the terminals of a first wiper switch 35 and the terminals 33 are connected to the terminals of a second wiper switch 37. The contact arm of each wiper switch is rotated by motors 41 and 43 respectively. Energy for exciting the phosphor layer 25 is provided by a direct, alternating, or pulse voltage from a modulated voltage source 41. Such modulated voltage source 45 may be a modified television receiver adapted to modulate the voltage between 20 and 2000 volts, depending upon the brightness desired at a particular point on the phosphor layer 25.

To operate the apparatus of Figures 1 and 2, the motors 41 and 43 are operated in synchronism at predetermined speed relationship with the incoming signal from the voltage source 45 and with each other, selectively energizing the conducting strips 23 and 27 line by line across the length of each conductor 27 of the second grid in its turn, thereby scanning the entire phosphor layer 25. As the conducting strips 23 and 27 are progressively energized, light is emitted by the phosphor layer 25 at the intersection point of the particular conducting strips being energized. For example, when the wiper switch contact arms are in the position illustrated in Figure 2, the point on the phosphor layer 25 is energized by a circuit consisting of a ground, the modulated voltage source 45, the wiper switch 35, the fifth conducting strip 23 from the left of the first grid, the phosphor layer 25, the fifth conducting strip 27 down from the top of the second grid, the wiper switch 37 and ground. At the moment the wipers make contact with the conductor, light is emitted from the phosphor layer 25 at the point where the conductors 25 and 27 intersect. Next the wipers progress to energize successive points along the fifth conductor down from the top, then along the sixth conductor down from the top, then along the seventh and so forth. According to the arrangement of the phosphor areas of Figure 1, first a red strip, then a green strip, then a blue strip, then a red strip and so forth, are scanned in turn across each conducting strip 27 of the second grid in turn down to the bottom of the phosphor layer 25. The screen is then scanned repeatedly in this manner producing a composite color image of electroluminescence emission. The color image may be observed through the transparent glass support plate 21.

Referring to Figure 3, there is shown the spectral distribution of the light emission of each of the phosphor area of the phosphor layer 25 of Example 1. By varying the brightness of light emitted from each area, it is possible to produce in each group any color over a wide range of the color spectrum. In addition to proper spectral distribution, the phosphor elements should emit sufficiently bright light within the usable range of electric fields. Additionally the phosphors of each area should possess a relatively fast decay characteristic which is substantially matched between each of the other phosphor areas. Finally, the range over which the brightness may be modulated should be substantially matched.

Phosphors from the following systems possess the foregoing properties and may be used in the screens of the invention:

Blue-emitting component

The blue-emitting phosphor may be selected from the system, $x$ZnS.$y$ZnSe:Cu($a$) wherein:

$x = 0.9$ to $1.0$ mol
$y = 0.1$ to $0.0$ mol
$x + y = 1.0$ mol
$a = 0.01$ to $0.3$ weight percent Such phosphors are prepared by mixing the ingredients in stoichiometric proportions with 0.2 to 10.0 weight percent of a flux consisting of at least one halide selected from the group consisting of halides of the alkali metals, the alkaline earth metals and the volatile cations, such as sodium chloride, ammonium bromide, calcium chloride, or sodium iodide. Preferably, 10 percent by weight of ammonium iodide is added as the flux. The batch is then fired in a closed container at a temperature between 850° and 1400° C., preferably 1000° C. in a non-reactive atmosphere.

Green-emitting component

The green-emitting phosphor may be selected from the system: $x$ZnS.$y$ZnSe:Cu($a$):Al($b$) wherein:

$x = 0.9$ to $1.0$ mol
$y = 0.1$ to $0.0$ mol
$x + y = 1.0$ mol
$a = 0.01$ to $0.3$ weight percent
$b = 0.004$ to $0.15$ weight percent Such phosphors may be prepared by the method described for the blue-emitting component except that in place of the halide flux, a stoichiometric quantity, as indicated by the desired formulation, of aluminum, as a salt, is substituted. Suitable aluminum salts are aluminum nitrate, aluminum oxalate and aluminum acetate. It is preferred that $a = b$.

Red-emitting component

The red-emitting element may be selected from the two systems: $x$ZnS.$y$ZnSe:Cu($a$) wherein:

$x = 0.001$ to $0.4$ mol
$y = 0.999$ to $0.6$ mol
$x + y = 1.0$ mol
$a = 0.01$ to $0.3$ weight percent;

and $c$ZnSe.$d$CdSe:Cu($a$) wherein:

$c = 0.75$ to $1.0$ mol
$d = 0.25$ to $0.0$ mol
$c + d = 1.0$ mol
$a = 0.01$ to $0.3$ weight percent The phosphors of either of these two systems may be prepared according to the method described under the blue-emitting component.

The phosphors are preferably mixed with a binder, such as a silicone resin, a polyvinyl alcohol, a polyvinyl acetate resin, or a cellulose acetate resin. The binder is preferably electrically-insulating and film-forming. The use of a minimum amount of binder is preferred. The phosphors may also be mixed with liquids, for example, castor oil, which are preferably electrically-insulating and film-forming. Alternatively, the phosphors may be used with no binders or additions whatsoever.

The phosphor or phosphor mix is then used to produce the desired phosphor areas. The areas may be lines, dots or other configuration arranged in a predetermined order of cyclic succession. Alternatively, the phosphor areas may comprise three separate monochromatic screens, one red, one green and one blue, and the emission therefrom optically combined to produce a polychromatic image. One feature of the invention comprises electroluminescent means including a combination of discrete electroluminescent areas including a blue-emitting area, a green-emitting area and a red-emitting area for producing polychromatic images. The phosphors therefore may be selected from the foregoing composition systems. Such combinations provide the necessary emission colors, decay characteristics and brightness balance.

*Example 2.*—The luminescent screens of the invention may comprise a multiplicity of groups of discrete electroluminescent phosphor dots arranged in a predetermined order of cyclic succession. Referring to Figure 4, there is shown apparatus similar to the apparatus of Figure 1, except that instead of strips, the groups comprise phosphor dots, each dot positioned in the space between a particular strip 23' of the first grid and a particular strip 27' of the second grid. Thus, instead of a screen made up of phosphor lines, the screen is made up of phosphor dots. The groups of phosphor dots of the layer 25' of Figure 4 comprise, for example, red-emitting dots having the approximate composition 0.95ZnSe.0.05CdSe.Cu(0.1)

green-emitting dots comprising a phosphor having the approximate composition 0.70ZnS.0.30ZnSe:Cu(0.1), and blue-emitting dots comprising a phosphor having the approximate composition 0.95ZnS.0.05ZnSe:Cu(0.1). This screen may be used in the manner described under Example 1. Similarly, any of the phosphors mentioned in Example 1 may be substituted for the phosphors of the dot screen of Example 2.

There have been described improved electroluminescent means and particularly polychromatic electroluminescence screens that are useful in color mural television and devices including such screens.

What is claimed is:

1. An electroluminescent screen comprising a multiplicity of groups of discrete electroluminescent phosphor elements arranged in a predetermined order of cyclic succession, each of said groups comprising a blue emitting element including a phosphor selected from the system $x$ZnS.$y$ZnSe:Cu($a$) wherein:

$x = 0.9$ to $1.0$ mol
$y = 0.1$ to $0.0$ mol
$x + y = 1.0$ mol
$a = 0.01$ to $0.3$ weight percent, a green-emitting element including a phosphor selected from the system $x$ZnS·$y$ZnSe:Cu($a$)Al($b$) wherein:

$x = 0.9$ to $1.0$ mol
$y = 0.1$ to $0.0$ mol
$x + y = 1.0$ mol
$a = 0.01$ to $0.3$ weight percent
$b = 0.004$ to $0.15$ weight percent, and a red-emitting element including a phosphor selected from the group of systems consisting of $x$ZnS·$y$ZnSe:Cu($a$)

wherein:

$x = 0.001$ to $0.400$ mol
$y = 0.999$ to $0.600$ mol
$x + y = 1.0$ mol
$a = 0.01$ to $0.3$ weight percent;

and $c$ZnSe·$d$CdSe:Cu($a$) wherein:

$c = 0.75$ to $1.0$ mol
$d = 0.25$ to $0.0$ mol
$c + d = 1.0$ mol
$a = 0.01$ to $0.3$ weight percent 2. An electroluminescent screen comprising a multiplicity of groups of discrete electroluminescent phosphor elements arranged in a predetermined order of cyclic succession, each of said groups comprising a blue-emitting element including a phosphor having the composition ZnS:Cu(0.1), a green-emitting element including a phosphor having the composition ZnS:Cu(0.1):Al(0.042) and a red-emitting element including a phosphor having the composition 0.95 ZnSe:0.05CdSe:Cu(0.15).

3. An electroluminescent screen comprising a multiplicity of groups of discrete electroluminescent phosphor elements arranged in a predetermined order of cyclic succession, each of said groups comprising a blue-emitting element including a phosphor having the composition 0.95 ZnS·0.05ZnSe:Cu(0.1), a green-emitting element including a phosphor having the composition 0.70ZnS·0.30ZnSe:Cu(0.1)

and a red-emitting element including a phosphor having the composition 0.95ZnSe:0.05CdSe:Cu(0.1).

4. An electroluminescent device comprising a screen including a multiplicity of groups of discrete electroluminescent phosphor elements arranged in a predetermined order of cyclic succession each of said groups consisting of a blue-emitting element, a green-emitting element, and a red-emitting element, and electrode means including an electrode on each side of said screen for establishing an electric field across each of said elements.

5. An electroluminescent device according to claim 4 wherein said elements are parallel electroluminescent phosphor lines.

6. An electroluminescent device according to claim 4 wherein said elements are electroluminescent phosphor dots.

7. An electroluminescent device comprising a screen including a mulitplicity of groups of discrete electroluminescent phosphor elements arranged in a predetermined order of cyclic succession, each of said groups consisting of a blue-emitting element, a green-emitting element, and a red-emitting element, electrode means including an electrode on each side of said screen for establishing an electric field across each of said elements, and means for exciting said elements in a predetermined order of cyclic succession.

8. An electroluminescent screen comprising a multiplicity of groups of discrete electroluminescent phosphor elements arranged in a predetermined order of cyclic succession, each of said groups consisting of a blue-emitting element, a green-emitting element, and a red-emitting element, a first grid of spaced parallel conductors in contact with one side of said phosphor elements and a second grid of spaced parallel conductors in contact with the opposite side of said phospor elements, the conductors of said second grid being spaced from and positioned at substantially right angles to the conductors of said first grid.

9. An electroluminescent screen comprising a multiplicity of groups of discrete electroluminescent phosphor elements arranged in a predetermined order of cyclic succession, each of said groups consisting of a blue-emitting element, a green-emitting element, and a red-emitting element, a first grid of spaced parallel conductors in contact with one side of said phosphor elements and a second grid of spaced parallel conductors in contact with the opposite side of said phosphor elements, the conductors of said second grid being spaced from and positioned at substantially right angles to the conductors of said first grid, each of said phosphor elements being positioned in the space between a particular conductor of a first grid and a particular conductor of said second grid.

10. An electroluminescent device comprising a combination of discrete electroluminescent phosphor elements comprising a blue-emitting element including a phosphor selected from the system $x$ZnS·$y$ZnSe:Cu($a$) wherein:

$x = 0.9$ to $1.0$ mol
$y = 0.1$ to $0.0$ mol
$x+y = 1.0$ mol
$a = 0.01$ to $0.3$ weight percent a green-emitting element including a phosphor selected from the system of $x$ZnS.$y$ZnSe:Cu($a$):Al($b$)

$x = 0.9$ to $1.0$ mol
$y = 0.1$ to $0.0$ mol
$x+y = 1.0$ mol
$a = 0.01$ to $0.3$ weight percent
$b = 0.004$ to $0.15$ weight percent, and a red-emitting element including a phosphor selected from the group of systems consisting of $x$ZnS:$y$ZnSe:Cu($a$)

wherein:

$x = 0.001$ to $0.400$ mol
$y = .999$ to $0.600$ mol
$x+y = 1.00$ mol
$a = 0.01$ to $0.3$ weight percent;

and $c$ZnSe·$d$CdSe:Cu($a$) wherein:

$c = 0.75$ to $1.0$ mol
$d = 0.25$ to $0.0$ mol
$c+d = 1.0$ mol
$a = 0.01$ to $0.3$ weight percent, and means for scanning said phosphor layer with a modulated electric field.

11. An electroluminescent device comprising a first grid of spaced parallel conductors, a second grid of spaced parallel conductors in spaced insulated relationship with said first grid, the conductors of said second grid running at substantially right angles with the conductors of said first grid, a phosphor layer between said grids said phosphor layer comprising a multiplicity of groups of discrete electroluminescent phosphor elements arranged in a predetermined order of cyclic succession, each of said groups comprising a blue-emitting element including a phosphor selected from the system $x$ZnS·$y$ZnSe:Cu($a$)

wherein:

$x = 0.9$ to $1.0$ mol
$y = 0.1$ to $0.0$ mol
$x+y = 1.0$ mol
$a = 0.01$ to $0.3$ weight percent, a green-emitting element including a phosphor selected from the system $x$ZnS·$y$ZnSe:Cu($a$):Al($b$) wherein:

$x = 0.9$ to $1.0$ mol
$y = 0.1$ to $0.0$ mol
$x+y = 1.0$ mol
$a = 0.01$ to $0.3$ weight percent
$b = 0.004$ to $0.15$ weight percent, and a red-emitting element including a phosphor selected from the group of systems consisting of $x$ZnS:$y$ZnSe:Cu($a$)

wherein:

$x = 0.001$ to $0.400$ mol
$y = .999$ to $0.600$ mol
$x+y = 1.00$ mol
$a = 0.01$ to $0.3$ weight percent;

and $c$ZnSe·$d$CdSe:Cu($a$) wherein:

$c = 0.75$ to $1.0$ mol
$d = 0.25$ to $0.0$ mol
$c+d = 1.0$ mol
$a = 0.01$ to $0.3$ weight percent, each of said phosphor elements being positioned in the space between a particular conductor of said first grid and a particular conductor of said second grid, and means for selectively energizing said first grid and said second grid to scan said phosphor layer with a modulated electric field.

12. An electroluminescent device according to claim 4 wherein each of said blue-emitting elements includes a phosphor selected from the system $x$ZnS.$y$ZnSe:Cu($a$) wherein:

$x = 0.9$ to $1.0$ mol
$y = 0.1$ to $0.0$ mol
$x+y = 1.0$ mol
$a = 0.01$ to $0.3$ weight percent 13. An electroluminescent device according to claim 4 wherein each of said green-emitting elements includes a phosphor selected from the system $$xZnS.yZnSe:Cu(a)Al(b)$$

wherein:

$x = 0.9$ to 1.0 mol
$y = 0.1$ to 0.0 mol
$x+y = 1.0$ mol
$a = 0.01$ to 0.3 weight percent
$b = 0.004$ to 0.15 weight percent 14. An electroluminescent device according to claim 4 wherein each of said red-emitting elements includes a phosphor selected from the group of systems consisting of: $xZnS.yZnSe:Cu(a)$ wherein:

$x = 0.001$ to 0.400 mol
$y = 0.999$ to 0.600 mol
$x+y = 1.0$ mol
$a = 0.01$ to 0.3 weight percent;

and $cZnSe.dCdSe:Cu(a)$ wherein:

$c = 0.75$ to 1.0 mol
$d = 0.25$ to 0.0 mol
$c+d = 1.0$ mol
$a = 0.01$ to 0.3 weight percent References Cited in the file of this patent

UNITED STATES PATENTS

| | | |
|---|---|---|
| 2,660,566 | Froelich | Nov. 24, 1953 |
| 2,698,915 | Piper | Jan. 4, 1955 |
| 2,728,011 | Goldsmith | Dec. 20, 1955 |
| 2,730,644 | Michlin | Jan. 10, 1956 |
| 2,745,035 | Lawrence | May 8, 1956 |
| 2,761,089 | Haeff | Aug. 28, 1956 |
| 2,784,341 | Huffman | Mar. 5, 1957 |
| 2,785,331 | Donahue | Mar. 12, 1957 |
| 2,838,715 | Payne | June 10, 1958 |

UNITED STATES PATENT OFFICE

CERTIFICATE OF CORRECTION

Patent No. 2,925,532                  February 16, 1960

Simon Larach

It is hereby certified that error appears in the printed specification of the above numbered patent requiring correction and that the said Letters Patent should read as corrected below.

Column 1, line 66, for "xXnS:yZnSe:Cu(a) read

-- xZnS:yZnSe:Cu(a) --.

Signed and sealed this 12th day of July 1960.

(SEAL)
Attest:

KARL H. AXLINE
Attesting Officer

ROBERT C. WATSON
Commissioner of Patents

Notice of Adverse Decision in Interference

In Interference No. 91,320 involving Patent No. 2,925,532, S. Larach, Polychromatic electroluminescent means, final decision adverse to the patentee was rendered Sept. 27, 1962, as to claims 4, 6 and 7.

[*Official Gazette August 20, 1963.*]